United States Patent
Cho et al.

(10) Patent No.: US 11,889,138 B2
(45) Date of Patent: Jan. 30, 2024

(54) SYSTEMS, SERVERS AND METHODS OF REMOTELY PROVIDING MEDIA TO A USER TERMINAL AND MANAGING INFORMATION ASSOCIATED WITH THE MEDIA

(71) Applicant: Hanwha Techwin Co., Ltd., Seongnam-si (KR)

(72) Inventors: Youngjin Cho, Seongnam-si (KR); Jongho Lee, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 585 days.

(21) Appl. No.: 15/968,969

(22) Filed: May 2, 2018

(65) Prior Publication Data

US 2018/0324479 A1    Nov. 8, 2018

Related U.S. Application Data

(60) Provisional application No. 62/500,390, filed on May 2, 2017.

(30) Foreign Application Priority Data

Aug. 28, 2017    (KR) ........................ 10-2017-0108801

(51) Int. Cl.
*H04L 65/60* (2022.01)
*H04N 21/262* (2011.01)
(Continued)

(52) U.S. Cl.
CPC ....... *H04N 21/26241* (2013.01); *H04L 65/60* (2013.01); *H04L 67/02* (2013.01);
(Continued)

(58) Field of Classification Search
CPC ......... H04N 21/26241; H04N 21/2743; H04N 21/41407; H04N 21/47202;
(Continued)

(56) References Cited

U.S. PATENT DOCUMENTS

| | | | |
|---|---|---|---|
| 7,676,590 | B2 | 3/2010 | Silverman |
| 9,602,846 | B1 | 3/2017 | Martel et al. |

(Continued)

FOREIGN PATENT DOCUMENTS

| | | |
|---|---|---|
| KR | 10-1452345 | 10/2014 |
| KR | 10-2016-0116493 | 10/2016 |

(Continued)

OTHER PUBLICATIONS

The Extended European Search Report dated Dec. 7, 2017, issued in European Patent Application No. 17194662.7.

(Continued)

*Primary Examiner* — Dhairya A Patel
(74) *Attorney, Agent, or Firm* — McLean IP Global; Jason Y. Pahng

(57) ABSTRACT

A system includes a storage device to store a plurality of media segment files captured at a first location, and a management server storing first metadata sets respectively associated with at least one characteristic of the plurality of media segment files. The management server may be configured to: receive a message from a user terminal requesting a media segment file based upon the at least one characteristic; transmit a second metadata set corresponding to the at least one characteristic to the user terminal in response to the request message; and transmit, in response to a request for media segment files associated with the second metadata set, the requested media segment files to the user terminal.

18 Claims, 16 Drawing Sheets

(51) Int. Cl.
*H04N 21/414* (2011.01)
*H04N 21/2743* (2011.01)
*H04N 21/8405* (2011.01)
*H04N 21/845* (2011.01)
*H04N 21/472* (2011.01)
*H04L 67/06* (2022.01)
*H04L 67/02* (2022.01)

(52) U.S. Cl.
CPC ......... *H04L 67/06* (2013.01); *H04N 21/2743* (2013.01); *H04N 21/41407* (2013.01); *H04N 21/47202* (2013.01); *H04N 21/8405* (2013.01); *H04N 21/8456* (2013.01)

(58) Field of Classification Search
CPC ............ H04N 21/8405; H04N 21/8456; H04L 65/60; H04L 67/02; H04L 67/06
See application file for complete search history.

(56) References Cited

U.S. PATENT DOCUMENTS

| | | | | |
|---|---|---|---|---|
| 11,804,154 B2* | 10/2023 | Lo | | G06F 3/167 |
| 2007/0162971 A1* | 7/2007 | Blom | | H04L 67/303 |
| | | | | 726/17 |
| 2007/0226365 A1* | 9/2007 | Hildreth | | H04L 29/06027 |
| | | | | 709/231 |
| 2011/0080940 A1* | 4/2011 | Bocharov | | H04N 21/4348 |
| | | | | 375/240.01 |
| 2011/0288946 A1* | 11/2011 | Baiya | | G06F 21/602 |
| | | | | 705/26.1 |
| 2013/0163580 A1 | 6/2013 | Vass | | |
| 2013/0185452 A1* | 7/2013 | Burckart | | H04N 21/24 |
| | | | | 709/231 |
| 2013/0219442 A1 | 8/2013 | Hu et al. | | |
| 2015/0032857 A1 | 1/2015 | Hamm et al. | | |
| 2015/0067811 A1* | 3/2015 | Agnew | | H04L 63/0281 |
| | | | | 726/9 |
| 2015/0104147 A1* | 4/2015 | Kosaka | | G06F 16/4393 |
| | | | | 386/239 |
| 2015/0304689 A1* | 10/2015 | Warren | | H04N 21/2181 |
| | | | | 725/92 |
| 2015/0350288 A1 | 12/2015 | Verma et al. | | |
| 2015/0370892 A1* | 12/2015 | McCoy | | G06F 16/683 |
| | | | | 707/769 |
| 2016/0119399 A1 | 4/2016 | Glass | | |
| 2016/0142507 A1* | 5/2016 | Slssingar | | H04L 67/2842 |
| | | | | 709/216 |
| 2016/0173960 A1* | 6/2016 | Snibbe | | H04N 21/233 |
| | | | | 386/285 |
| 2016/0198161 A1 | 7/2016 | Samuelsson et al. | | |
| 2016/0211002 A1 | 7/2016 | Tada et al. | | |
| 2016/0214012 A1* | 7/2016 | Nishikawa | | A63F 13/497 |
| 2017/0006312 A1 | 1/2017 | Yang et al. | | |
| 2017/0078359 A1 | 3/2017 | Herrero | | |
| 2017/0201562 A1 | 7/2017 | Moon et al. | | |
| 2017/0286195 A1* | 10/2017 | Pak | | G06F 9/546 |
| 2017/0295454 A1* | 10/2017 | Albrecht | | H04L 67/02 |
| 2018/0242044 A1* | 8/2018 | Zhao | | H04N 21/475 |
| 2018/0309688 A1 | 10/2018 | Sarker et al. | | |
| 2021/0224357 A1* | 7/2021 | Lev-Ami | | H04L 9/32 |
| 2023/0353798 A1* | 11/2023 | Trehan | | H04N 21/251 |

FOREIGN PATENT DOCUMENTS

| | | |
|---|---|---|
| KR | 10-2016-0127422 | 11/2016 |
| KR | 10-2017-0013873 | 2/2017 |
| KR | 10-1742420 | 5/2017 |
| KR | 10-2017-0084745 | 7/2017 |
| WO | 2005/111835 | 11/2005 |

OTHER PUBLICATIONS

Non-Final Office Action dated Mar. 29, 2019 in U.S. Appl. No. 15/685,538.

Notice of Allowance dated Oct. 30, 2019, in U.S. Appl. No. 15/685,538.

* cited by examiner (Play back MSFk in visible state)

FIG. 14
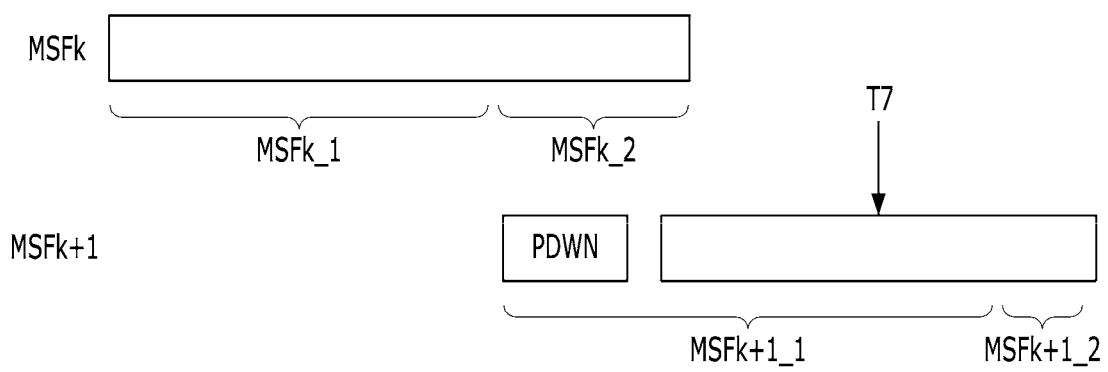
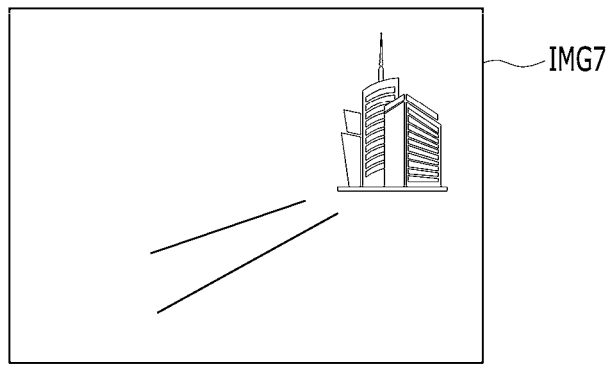
(Play back MSFk+1 in visible state)

SYSTEMS, SERVERS AND METHODS OF REMOTELY PROVIDING MEDIA TO A USER TERMINAL AND MANAGING INFORMATION ASSOCIATED WITH THE MEDIA

CROSS REFERENCE TO RELATED APPLICATION

This application claims priority from and the benefit of Korean Application No. 10-2017-0108801, filed on Aug. 28, 2017, and U.S. Provisional Patent Application No. 62/500,390, filed on May 2, 2017, each of which is hereby incorporated by reference for all purposes as if fully set forth herein.

BACKGROUND

Field

Exemplary implementations of the invention relate generally to remote provision of media, including video and/or audio content, and more specifically, to systems, servers and methods of remotely providing media to a user terminal, methods of managing information associated with the media, and a network server communicating with the user terminal.

Discussion of the Background

Given the increasing power and prevalence of small computers and mobile devices, such as cellphones, tablets and similar devices, much activity has been directed to providing video and/or audio content ("media) to remote devices ("user terminals"). This feature is particularly advantageous in security and surveillance systems, which enable media, such as images captured from a close circuit television ("CCTV") system, to be remotely viewed from any device connected to the Internet. Various technologies have been tried to realize remote viewing of media data with little success.

For example, real-time streaming is a method of transmitting media to a user terminal in real time and playing back the transmitted media by the user terminal. For example, the RTSP (real-time streaming protocol), the RTP (real-time transport protocol), the RTMP (real-time messaging protocol) and so on are being used for communication of media. Since a transmitter and a receiver should include components suitable for using such streaming protocols, such as a streaming server and client, the cost of implementing such a system is relatively high.

Conversely, some technologies have attempted to avoid real-time streaming, e.g., in the case of communicating media based on various file transfer protocols, such as the HTTP (hypertext transfer protocol) or the FTP (file transfer protocol). In these cases, it may be difficult for a receiver to play back selected media, such as media from a desired time interval among media files, within a short period of time.

U.S. Pat. No. 9,602,846 is directed to digital content streaming and attempts to address these issues with a video encoder that, after capturing video from a video source, creates segment files defined by content over a particular length of time, and a manifest file, and uploads them to a cloud server. The manifest file contains information concerning all of the segment files including information that allows those segment files to be located and downloaded from the cloud server or any other location at which they may be stored. The end user may request and download the manifest file from the cloud server and store it on its local drive, and may play back the segment files. However, this system requires that the end user have a decoder client with an additional module that processes information from the manifest file to determine which particular segment file is desired, such as one corresponding to a certain time interval selected by the end user, since a single manifest file is provided for all the media files.

The above information disclosed in this Background section is only for understanding of the background of the inventive concepts, and, therefore, it may contain information that does not constitute prior art.

SUMMARY

Devices constructed according to, and methods employing the principles of, exemplary implementations of the invention are capable of enabling a user terminal to seamlessly play back media, while reducing resources in, and increasing the efficiency of, a system for seamless playback of media.

According to the principles and exemplary implementations of the invention, a user may employ a conventional user terminal, such as a smart phone, tablet or the like, and continuously play back selected media, e.g., corresponding to a selected time interval or a selected event or condition, within a short period of time from when playback is requested without use of a streaming server function for transmitting media or a streaming client function for receiving streamed media. Therefore, the user terminal may efficiently play back selected media, and resources in the network system necessary therefor may be reduced and more efficiently used.

According to the principles and exemplary implementations of the invention, compatibility with and ease of use of the user terminal may be improved, as no extra applications or programs are required, and at the same time, the initial time delay required for the user terminal to play back the selected media may be relatively decreased.

According to the principles and exemplary implementations of the invention, a part of one media segment file is downloaded while a remaining part of the media segment file is played back. The downloaded part of the media segment file is loaded in the internal memory of the user terminal. Given that the loaded data is a part of the media segment files generated as the media data are generated and divided into segments, the space in the internal memory necessary to load the downloaded data may be relatively small. In addition, since the part of the media segment file is loaded into internal memory, the remaining part may be played back without an initial time delay at a time when the playback of the first part is completed. Thus, even while the internal memory of the relatively small space is used, the media segment files may be continuously played back without significant time delays.

Furthermore, by the use of, and appropriately changing the sequence, of metadata sets representative of media segment files according to the principles and exemplary embodiments of the invention, the sequence of media segment files to be played back may be flexibly changed without compromising ease of use or compatibility of the user terminal.

Additional features of the inventive concepts will be set forth in the description which follows, and in part will be apparent from the description, or may be learned by practice of the inventive concepts.

According to one or more implementations of the invention, a system includes: a storage device to store a plurality of media segment files captured at a first location; a management server storing first metadata sets respectively associated with at least one characteristic of the plurality of media segment files, the management server is configured to: receive a message from a user terminal requesting a media segment file based upon the at least one characteristic; transmit a second metadata set corresponding to the at least one characteristic to the user terminal in response to the request message; and transmit, in response to a request for media segment files associated with the second metadata set, the requested media segment files to the user terminal.

The media segment files captured at the first location may be obtained in continuous time intervals, each of the first metadata sets may include information indicating a time interval of a corresponding media segment file, and the at least one characteristic may include a selected time interval.

The at least one characteristic may include a selected event type, each of the first metadata sets includes an event type of a corresponding media segment file, and each of the second metadata sets may have the selected event type.

According to other exemplary implementations of the invention, a server includes: first metadata sets respectively associated with a plurality of media segment files, each of the first metadata sets being associated with at least one characteristic of a corresponding media segment file; and a processor configured to receive a message from a user terminal requesting a media segment file based upon the at least one characteristic and to transmit a second metadata set corresponding to the at least one characteristic to the user terminal in response to the request message.

The at least one characteristic may include at least one of a time and an event type.

According to still other exemplary implementations of the invention, a method of providing selectable media captured at one location to another location includes the steps of: storing a plurality of media segment files captured at a first location; storing first metadata sets respectively associated with at least one characteristic of the plurality of media segment files; receiving a message from a user terminal requesting a media segment file based upon the at least one characteristic; transmitting a second metadata set corresponding to the at least one characteristic to the user terminal in response to the request message; and transmitting, in response to a request for media segment files associated with the second metadata set, the requested media segment files to the user terminal.

The media segment files captured at the first location may be obtained in continuous time intervals, each of the first metadata sets may include information indicating a time interval of a corresponding media segment file, and the at least one characteristic may include a selected time interval.

The at least one characteristic may include a selected event type, and each of the first metadata sets may include an event type of a corresponding media segment file. Each of the second metadata sets may have the selected event type.

The step of transmitting the requested media segment files may include transmitting the requested media segment files to the user terminal based on HTTP (hypertext transfer protocol) and FTP (file transfer protocol).

The method may further include the steps of: receiving the plurality of media segment files through a network from an external media uploader; and receiving additionally the first metadata sets from the media uploader.

The step of receiving of the plurality of media segment files may include receiving the plurality of media segment files from the media uploader based on HTTP and the FTP.

According to still other exemplary implementations of the invention, a method of managing information associated with selectable media includes the steps of: receiving first metadata sets respectively associated with a plurality of media segment files, each of the first metadata sets being associated with at least one characteristic of a corresponding media segment file; receiving a message from a user terminal requesting a media segment file based upon the at least one characteristic; and transmitting a second metadata set corresponding to the at least one characteristic to the user terminal in response to the request message.

The media segment files captured at the first location may be obtained in continuous time intervals, each of the first metadata sets may include information indicating a time interval of a corresponding media segment file, and the at least one characteristic may include a selected time interval.

The first metadata sets may be associated with at least one media storage unit to which the plurality of media segment files are uploaded.

The at least one characteristic may further include a selected event type.

Each of the first metadata sets may further include an event type of a corresponding media segment file, and the second metadata set may have the selected event type.

The method may further include the steps of: receiving a request to change an event type of at least one of the first metadata sets; and updating the at least one first metadata set, to have the changed event type.

According to still other another exemplary implementations of the invention, a user terminal includes: a communicator to communicate with at least one media storage unit through a network; and at least one processor configured to request metadata sets of media segment files based upon at least one characteristic of the media segment files, download the media segment files through the network from the at least one media storage unit based upon the metadata sets, and play back the downloaded media segment files. The at least one processor is further configured to: play back a first media segment file while downloading the first media segment file; download a part of a second media segment file while a remaining part of the first media segment file is played back after a part of the first media segment file is played back; and start playback of the part of the downloaded second media segment file at a time when playback of the remaining part of the first media segment file is completed.

The user terminal may be further include a display, and the processor may be further configured to download the part of the second media segment file by playing back the part of the second media segment file on the display in a hidden state and/or in a muted state.

The at least one processor may be configured to play back the part of the second media segment file in the hidden state and/or in the muted state at a position of the display where the remaining part of the first media segment file is played back.

The processor may be further configured to set a progress time of the second media segment file to 0 after the part of the second media segment file is played back in the hidden state and/or in the muted state.

The processor may be further configured to start the playback for the downloaded second media segment file by playing back the downloaded second media segment file in a visible state from the set progress time.

The at least one characteristic may include at least one of a time interval and an event type.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIGS. 10 to 14 are conceptual diagrams illustrating exemplary embodiments of some steps for downloading and playing back a k^th media segment file and a (k+1)^th media segment file.

DETAILED DESCRIPTION

Figure 1:
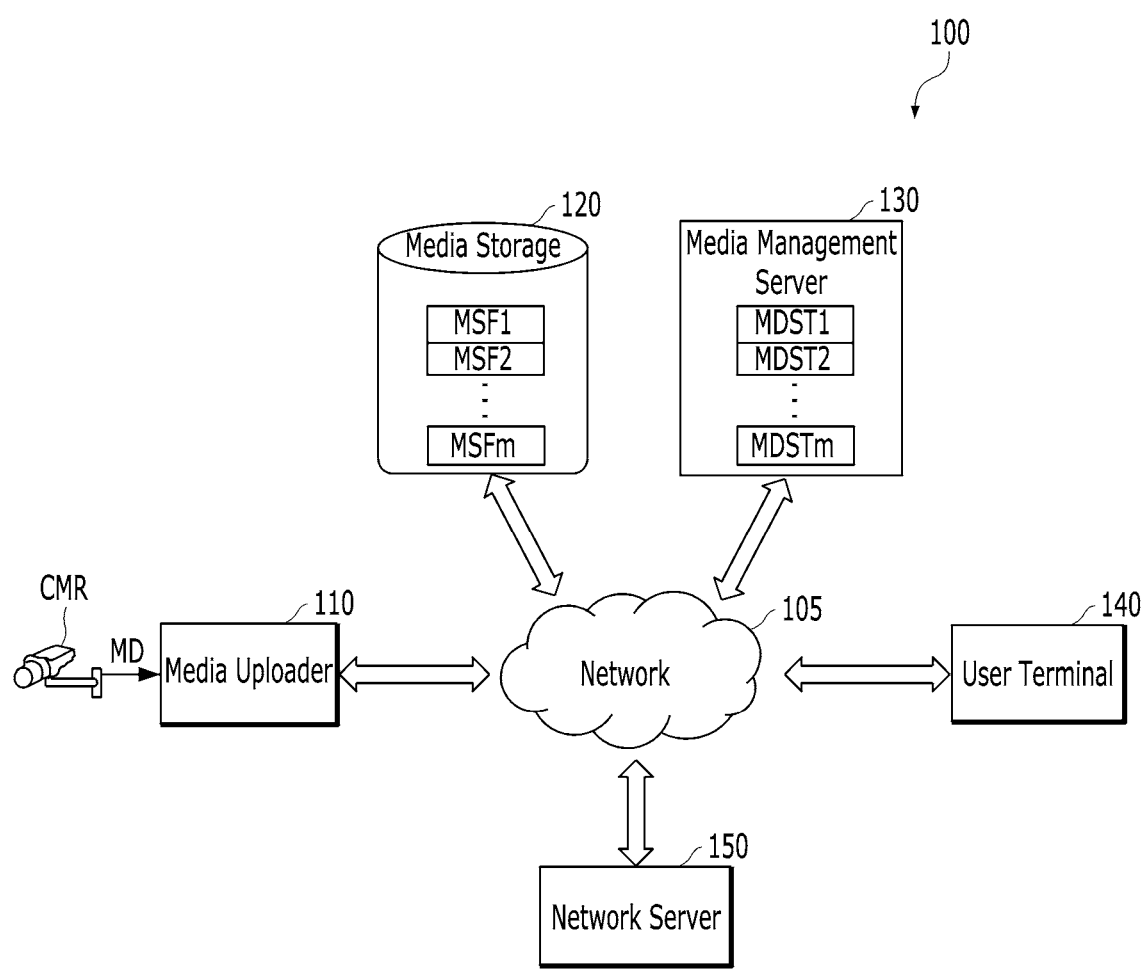
FIG. 1 is a block diagram of an exemplary embodiment of a network system constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, devices, servers, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, devices, servers, and/or one or more components thereof may include or otherwise be associated with one or more memories (not shown) including code (e.g., instructions) configured to cause devices, servers, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram of an exemplary embodiment of a network system constructed according to the principles of the invention.

Referring to FIG. 1, the network system 100 includes a network 105, a media uploader 110, at least one media storage unit 120, a media management server 130, a user terminal 140 and a network server 150.

Each of the media uploader 110, the media storage unit 120, the media management server 130, the user terminal 140 and the network server 150 may include one or more processors, memories and other appropriate components for executing instructions such as program codes or data stored in a computer-readable medium, and thereby, may perform various applications and steps described herein. For example, instructions may be stored in a computer-readable medium which is disposed inside or outside a corresponding component.

The network 105 connects the media uploader 110, the media storage unit 120, the media management server 130, the user terminal 140 and the network server 150. The network 105 may include at least one of a public network, such as the Internet, at least one private network, a wired network, a wireless network, other appropriate types of networks and combinations thereof. Each of the media uploader 110, the media storage unit 120, the media management server 130, the user terminal 140 and the network server 150 may include at least one of a wired communication function and a wireless communication function, and accordingly, they may communicate with one another through the network 105.

The media uploader 110 communicates with the media storage unit 120 and the media management server 130 through the network 105. The media uploader 110 receives media data MD (or multimedia data) from a camera CMR. The camera CMR may be any image capture device, including, for example, an image sensor which converts optical signals inputted through a lens into electronic signals, and a microphone which converts voice into electronic signals, and accordingly, may output the media data MD. The image capture of the camera CMR is turned on/off according to various known methods, and the camera CMR may output the media data MD when it is in a turned-on state. Hereinbelow, for the sake of convenience in explanation, it is assumed that the media data MD is obtained during a continuous time interval, for example, when the camera CMR is in a turned-on state. However, it is to be noted that exemplary embodiments of the invention are not limited thereto.

The media uploader 110 may divide the media data MD into first to m^th media segment files MSF1 to MSFm, respectively, corresponding to contiguous time intervals, and may upload the first to m^th media segment files MSF1 to MSFm to the media storage unit 120 (where m is a natural number of 1 or more). For example, the media uploader 110 may generate the first to m^th media segment files MSF1 to MSFm by dividing the media data MD by the unit of 10 seconds to produce 10 second long segments. Each of the first to m^th media segment files MSF1 to MSFm may be independently played back. In an exemplary embodiment, each of the first to m^th media segment files MSF1 to MSFm may be stored as a MPEG-4 Video file (MP4 format).

In an exemplary embodiment, the media uploader 110 and the camera CMR may be included as components of at least one image capture device that has the function of transmitting the media data MD through the network 105, such as an IP (Internet protocol) camera, a network video recorder and a web camera. In another exemplary embodiment, the media uploader 110 may communicate with the camera CMR through the network 105. In this case, the camera CMR may be a device that has the function of transmitting the media data MD through the network 105.

While one media storage unit 120 is shown in FIG. 1, exemplary embodiments of the invention are not limited thereto. For example, the media uploader 110 may upload the first to mˆth media segment files MSF1 to MSFm to a plurality of media storage units.

The media uploader 110 generates first to mˆth metadata sets MDST1 to MDSTm corresponding to the first to mˆth media segment files MSF1 to MSFm, respectively. The media uploader 110 also generate and uploads first to mˆth metadata sets MDST1 to MDSTm to the media management server 130.

Each of the first to mˆth metadata sets MDST1 to MDSTm may represent certain properties of a corresponding media segment file. For example, each metadata set may include information such as a time interval, a frame rate, a resolution, a file size and a codec, as properties, as described in conjunction with FIG. 4. Each of the first to mˆth metadata sets MDST1 to MDSTm may also include information on the contents of a corresponding media segment file. For example, each metadata set may include information such as a thumbnail and an event type, as information on contents. For example, each metadata set may include information associated with an address where a corresponding media segment file is stored, for example, a URL (uniform resource locator).

The user terminal 140 communicates with the media storage unit 120 and the media management server 130 through the network 105. The user terminal 140 may include at least one device capable of downloading through the network 105 and playing back the first to mˆth media segment files MSF1 to MSFm, such as a personal computer (PC), a desktop computer, a laptop computer, a portable computer, a PDA (personal digital assistant), an electronic watch, a smart phone, a tablet PC, a video game console, and similar devices.

To play back a desired media file, user terminal 140 first accesses the media management server 130. The user terminal 140 requests one of more desired metadata sets, e.g., based upon selected time interval(s) from the media management server 130. For example, a time interval may be selected by a user input. For another example, a time interval may be selected by an instruction provided from outside the user terminal 140 or included therein. The selected time interval may include a continuous time interval. For another example, the selected time interval may include continuous time intervals that are separated from one another.

The user terminal 140 receives at least a part of the first to mˆth metadata sets MDST1 to MDSTm. Based on each of received metadata sets, an address on the network 105 where a corresponding media segment file is stored, for example, a URL, may be specified. Such a URL may indicate the media storage unit 120 in which the selected media segment file is stored. In this way, the user terminal 140 downloads from the media storage unit 120 specified by the received metadata sets and plays back the selected media segment files.

The media storage unit 120 and the media management server 130 communicate with the network 105 based on at least one communication protocol, for example, the HTTP (hypertext transfer protocol) or the FTP (file transfer protocol).

The media storage unit 120 may receive the first to mˆth media segment files MSF1 to MSFm from the media uploader 110, and may transmit at least a part of the first to mˆth media segment files MSF1 to MSFm in response to a request of the user terminal 140.

The media management server 130 may receive the first to mˆth metadata sets MDST1 to MDSTm from the media uploader 110, and may provide at least a part of the first to mˆth metadata sets MDST1 to MDSTm in response to a request of the user terminal 140.

Figure 2:
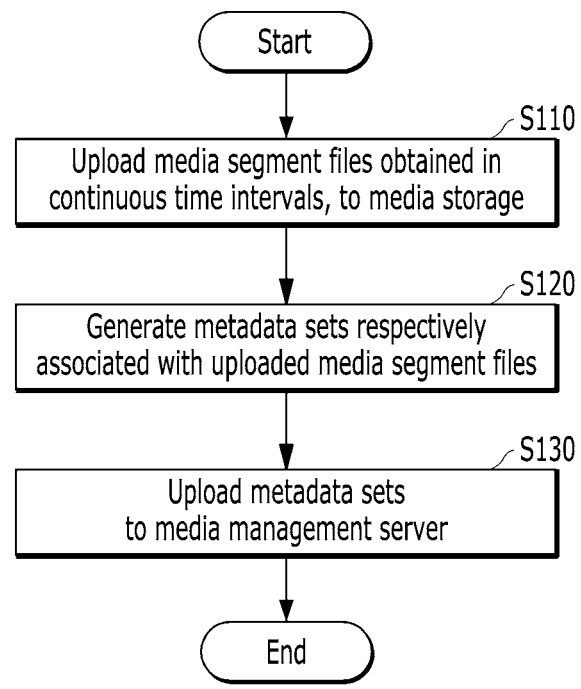
FIG. 2 is a flow chart of an exemplary method of operating a media uploader according to the principles of the invention.

FIG. 2 is a flow chart of an exemplary method of operating a media uploader according to the principles of the invention.

Referring to FIGS. 1 and 2, at step S110, the first to mˆth media segment files MSF1 to MSFm which may be obtained in contiguous time intervals are uploaded to the media storage unit 120. For example, the media uploader 110 may generate the first to mˆth media segment files MSF1 to MSFm by dividing the media data MD by a predetermined time unit, and may upload the media segment files to the media storage unit 120. In an exemplary embodiment, the media uploader 110 may store the first to mˆth media segment files MSF1 to MSFm in a predetermined storage space of the media storage unit 120. In another exemplary embodiment, the media uploader 110 may inquire of the media management server 130 a storage space, and may store the first to mˆth media segment files MSF1 to MSFm in a storage space of the media storage unit 120 that is determined depending on a result of the inquiry. The media uploader 110 may communicate with the media storage unit 120 based on at least one communication protocol, for example, the HTTP or the FTP.

At step S120, the first to mˆth metadata sets MDST1 to MDSTm corresponding to the uploaded first to mˆth media segment files MSF1 to MSFm, respectively, are generated in the media uploader 110. The media uploader 110 may also generate, after the first to mˆth media segment files MSF1 to MSFm are successfully uploaded, a metadata set representing certain properties of each media segment file. Each metadata set may be associated with the address of each media segment file stored in the media storage unit 120.

At step S130, the generated first to mˆth metadata sets MDST1 to MDSTm are uploaded to the media management server 130.

Figure 3:
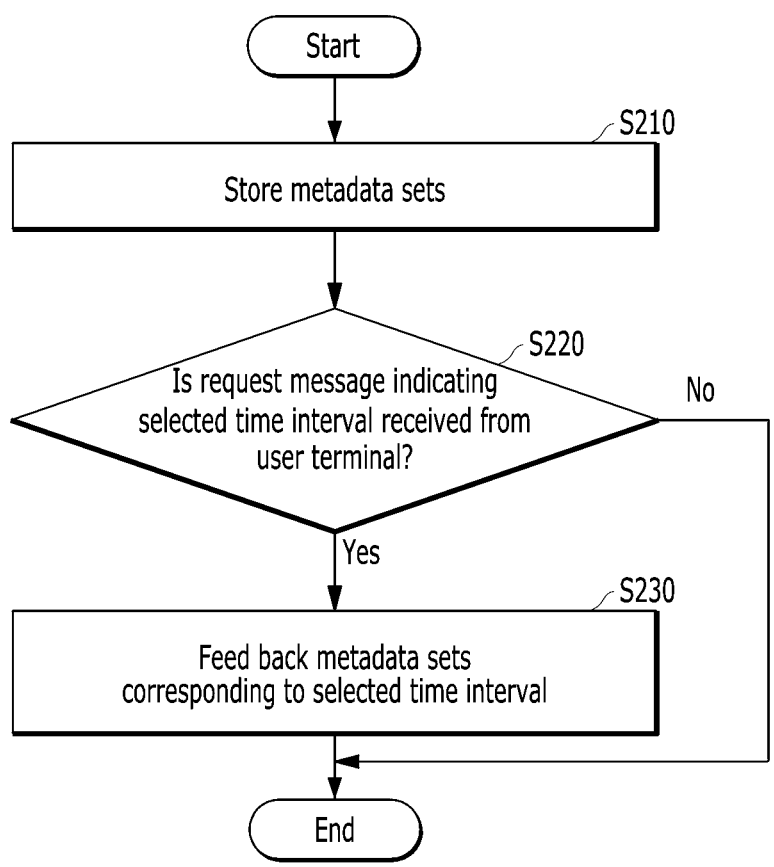
FIG. 3 is a flow chart of an exemplary method of operating a media management server according to the principles of the invention.
Figure 4:
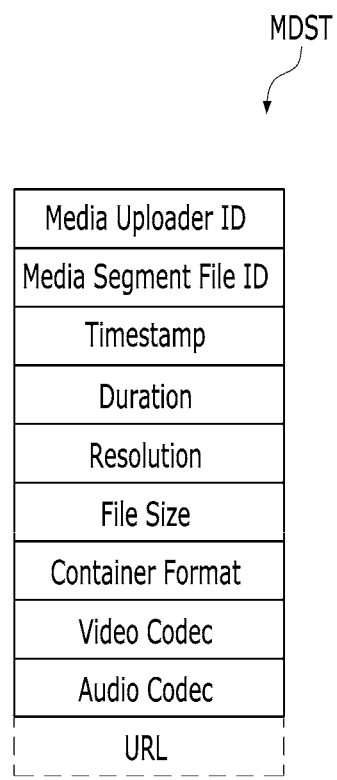
FIG. 4 is a conceptual diagram illustrating the structure of one of the metadata sets stored in the media management server according to an exemplary embodiment.

FIG. 3 is a flow chart of an exemplary method of operating a media management server according to the principles of the invention. FIG. 4 is a conceptual diagram illustrating the structure of one of the metadata sets stored in the media management server according to an exemplary embodiment.

Referring to FIGS. 1 and 3, at step S210, the first to mˆth metadata sets MDST1 to MDSTm provided from the media uploader 110 are stored in the media storage unit 120. Each metadata set includes certain properties of a corresponding media segment file. Referring to FIG. 4, the metadata set MDST may include, e.g., the ID of the media uploader 110, the ID of a media segment file, a timestamp indicating the time at which the media segment file is obtained, the duration of the media segment file, the resolution of the media segment file, the size of the media segment file, the container format of the media segment file, and the video codec and audio codec of the media segment file. The timestamp and the duration represent a time interval for which the media segment file is obtained.

In an exemplary embodiment, by using the properties included in the metadata set MDST, an address where the media segment file is stored, for example, a URL, may be specified. For example, an address where the media segment file is stored may be generated by using the properties included in the metadata set MDST, according to any predetermined method known in the art. In an exemplary embodiment, the metadata set MDST may further include a URL where the media segment file is stored. That is, the metadata set MDST is associated with an address where the media segment file is stored.

Referring again to FIG. 3, at step S220, it is determined whether a request message indicating a selected time interval is received from the user terminal 140. If so, step S230 is performed.

At the step S230, metadata sets corresponding to the selected time interval are fed back to the user terminal 140. The media management server 130 may search a metadata set which has a time interval belonging at least partially to the selected time interval, among the first to m^th metadata sets MDST1 to MDSTm. The media management server 130 transmits searched metadata sets to the user terminal 140.

Thereafter, as described above with reference to FIG. 1, the user terminal 140 may sequentially download from the media storage unit 120 and play back media segment files, by referring to received metadata sets.

According to the principles and exemplary embodiments of the invention, the downloaded media segment files are generated as the media data MD is divided. When playing back the media segment files of the selective time interval, and the user terminal 140 downloads a next media segment file while a previous media segment file is being played back. Accordingly, the playback of the next media segment file may be started without an initial time delay when the playback of the previous media segment file is completed. Also, since each media segment file is stored in a format such as the MP4, it may be downloaded and played back independently. Accordingly, without requiring the media storage unit 120 to have a streaming server function for transmitting media in a streaming method and without requiring the user terminal 140 to have a streaming client function for receiving media in the streaming method, the user terminal 140 may continuously play back media corresponding to the selected time interval within a short period of time from a time when playback is requested. Therefore, the user terminal 140 may efficiently play back media corresponding to the selected time interval, and resources in the network system 100 necessary therefor may be reduced and more efficiently used compared to streaming.

In conventional systems, the time interval selected by the user terminal may be changed variously. If the plurality of media segment files MSF1 to MSFm correspond to single metadata set, as disclosed in U.S. Pat. No. 9,602,846 discussed above, even when a selected time interval corresponds to a part of the plurality of media segment files MSF1 to MSFm, the user terminal may sequentially download the entire media segment files MSF1 to MSFm according to the metadata set for playing back the part of the plurality of media segment files MSF1 to MSFm. This may mean that a relatively long initial time delay is required to play back the media of the selected time interval. If the user terminal processes a single metadata set to determine which media segment files correspond to the selected time interval according to a predetermined method known in the art and then downloads and plays back the determined media segment files, the user terminal should include an additional module that supports the predetermined method and processes the single metadata set. In other words, a normal user terminal that does not include the additional module cannot play back the media segment files based on the single metadata set. For example, in order to play back the media segment files based on the single metadata set as disclosed in U.S. Pat. No. 9,602,846, the user terminal must download and install the additional module. Accordingly, in these types of conventional systems, the user terminals must be compatible with the specific download and playback technology employed.

According to exemplary embodiments of the invention, the media management server 130 stores the plurality of metadata sets MDST1 to MDSTm corresponding to the plurality of media segment files MSF1 to MSFm, respectively, and provides metadata sets corresponding to a selected time interval to the user terminal 140. This may enable the user terminal 140 to play back desired media corresponding to the selected time interval, by downloading media segment files from addresses (for example, 120 of FIG. 1) respectively corresponding to the metadata sets and playing back the downloaded media segment files without additional processes or software installed on the user terminal. Accordingly, compatibility with and ease of use of the user terminal 140 may be improved, as no extra applications or programs are required in the user terminal 140, as with streaming services, and at the same time, an initial time delay required for the user terminal 140 to play back the media of a selected time interval may be relatively decreased. Furthermore, by appropriately changing the sequence of the metadata sets provided to the user terminal 140, the sequence of media segment files to be played back in the user terminal 140 may be flexibly changed without compromising ease of use or compatibility.

Figure 5:
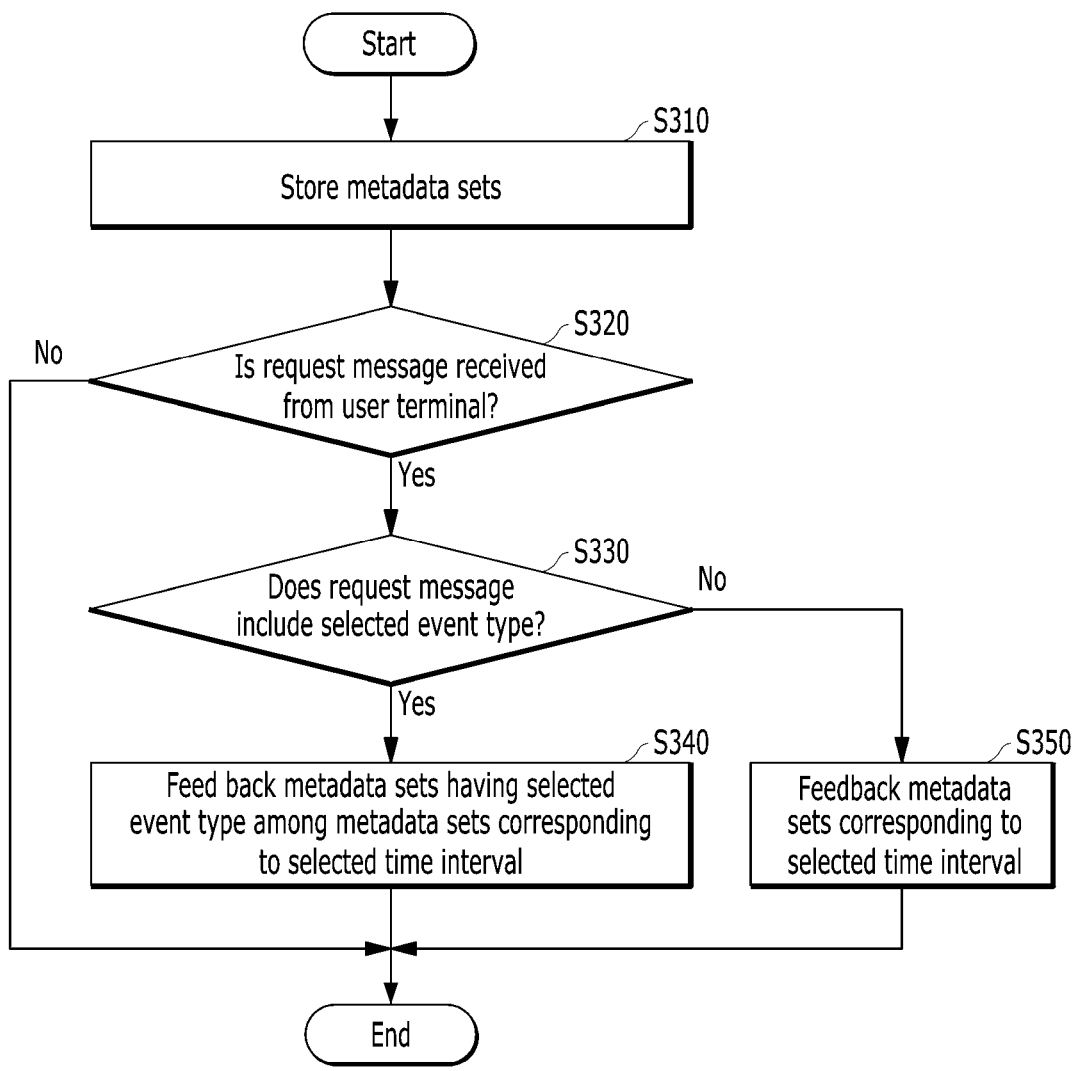
FIG. 5 is a flow chart of another exemplary method of operating a media management server according to the principles of the invention.
Figure 6:
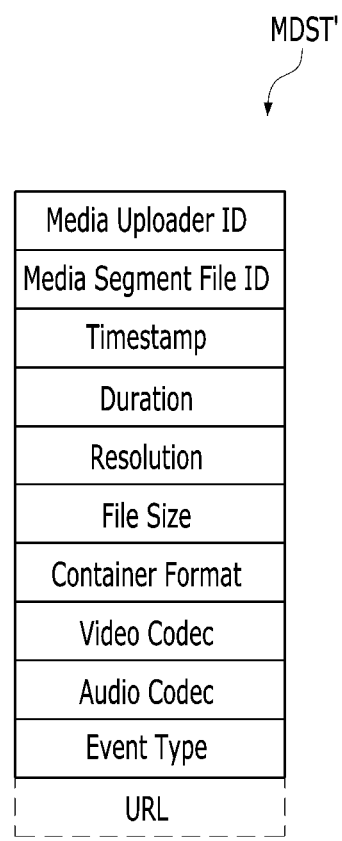
FIG. 6 is a conceptual diagram illustrating the structure one of the metadata sets stored in the media management server according to another exemplary embodiment.

FIG. 5 is a flow chart of another exemplary method of operating a media management server according to the principles of the invention. FIG. 6 is a conceptual diagram illustrating the structure one of the metadata sets stored in the media management server according to another exemplary embodiment.

Referring to FIG. 5, at step S310, the first to m^th metadata sets MDST1 to MDSTm provided from the media uploader 110 are stored. The first to m^th metadata sets MDST1 to MDSTm correspond to the first to m^th media segment files MSF1 to MSFm, respectively. Referring to FIG. 6, when compared to the metadata set MDST of FIG. 4, the metadata set MDST' further includes information on contents, for example, an event type represented in the contents of a media segment file. For example, as an event type, various types useful in surveillance systems such as motion detection, audio detection, face detection, body detection, fire detection, crying sound detection, gunfire sound detection and impact sound detection may be defined. The event type field of the metadata set MDST' may represent at least one of the various types described above. The media uploader 110 and/or the camera CMR may detect an event represented in contents by using various methods known in the art, determine an event type and include the event type in the metadata set MDST'.

Referring again to FIG. 5, at step S320, it is determined whether a request message is received from the user terminal 140. If so, step S330 is performed. When a user selects one of various event types, the user terminal 140 may include the selected event type in the request message. Therefore, at the step S330, whether the request message includes not only a selected time interval but also the selected event type is determined. If so, step S340 is performed. If not so, step S350 is performed.

At the step S340, metadata sets having the selected event type of metadata sets corresponding to the selected time interval are fed back. This may enable the user terminal 140 to play back media of the selected time interval and the selected event type by downloading media segment files from addresses respectively corresponding to the received metadata sets and playing back the downloaded media segment files. Due to the selection of the event type, media segment files of discontinuous time intervals may be downloaded and played back.

At the step S350, metadata sets corresponding to the selected time interval are fed back to the user terminal 140.

Figure 7:
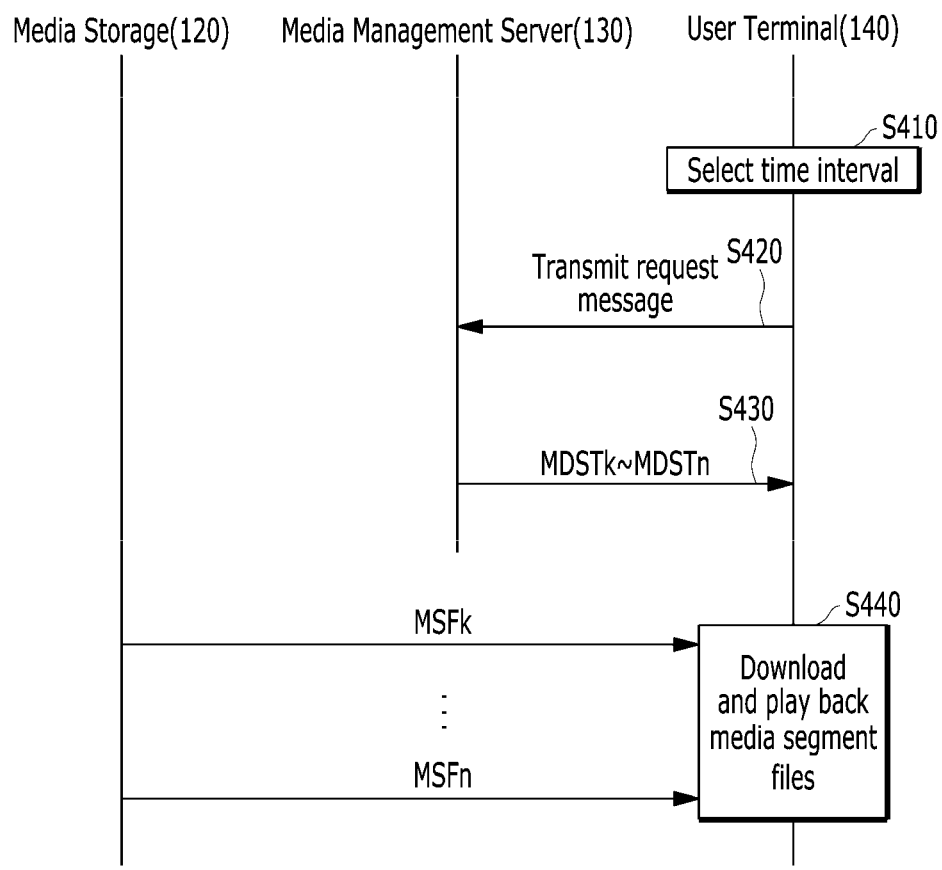
FIG. 7 is a flow chart of an exemplary method of playing back media segment files in a user terminal according to the principles of the invention.

FIG. 7 is a flow chart of an exemplary method of playing back media segment files in a user terminal according to the principles of the invention.

Referring to FIG. 7, at step S410, a time interval is selected. For example, a time interval may be selected by a user input. For another example, a time interval may be selected by an instruction provided from outside the user terminal 140 or included therein. The selected time interval may include a continuous time or time intervals that are separated from one another. Further, an event type may be additionally selected. At step S420, the user terminal 140 transmits a request message to the media management server 130. At step S430, the media management server 130 feeds back corresponding metadata sets in response to the request message. If the selected time interval is a continuous time, as shown in FIG. 7, sequential k^th to n^th metadata sets MDSTk to MDSTn may be provided to the user terminal 140 (k is a natural number of 1 or more and n is a natural number less than or equal to m). If the selected time interval includes time intervals that are separated from one another, metadata sets corresponding to non-contiguous time intervals may be provided to the user terminal 140. For example, k^th to p^th metadata sets MDSTk to MDSTp and q^th to n^th metadata sets MDSTq to MDSTn may be provided to the user terminal 140 (p is a natural number less than n and q is a natural number greater than p and less than n). Hereinafter, for the sake of convenience in explanation, it is assumed that the sequential k^th to n^th metadata sets MDSTk to MDSTn are provided to the user terminal 140.

At step S440, the user terminal 140 downloads and plays back media segment files MSFk to MSFn corresponding to the received metadata sets, respectively. The user terminal 140 may download the media segment files MSFk to MSFn from the media storage unit 120 based on at least one communication protocol, for example, the HTTP or the FTP.

Figure 8:
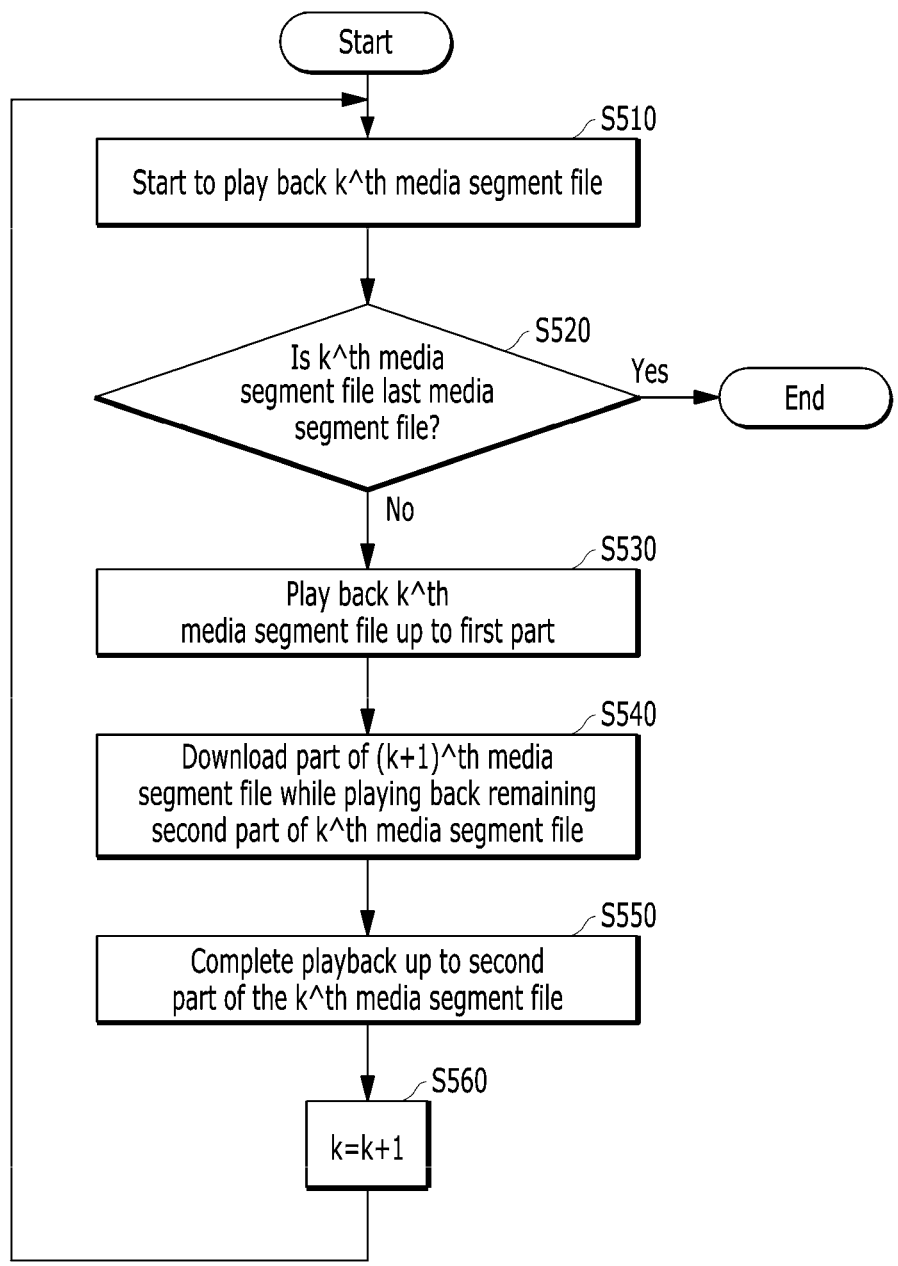
FIG. 8 is a flow chart illustrating an exemplary embodiment of the step S440 of FIG. 7.

FIG. 8 is a flow chart illustrating an exemplary embodiment of the step S440 of FIG. 7.

Referring to FIG. 8, at step S510, the k^th media segment file MSFk starts to be played back. In an exemplary embodiment, a media segment file may be based on MP4 format. The user terminal 140 may support the function of playing back a downloaded media segment file, in parallel with downloading of a media segment file.

At step S520, whether the k^th media segment file MSFk is a last media segment file is determined. If not so, step S530 is performed.

At the step S530, the k^th media segment file MSFk is played back up to a first part thereof. At step S540, a part of a (k+1)^th media segment file MSFk+1 is downloaded while the remaining second part of the k^th media segment file MSFk is played back. In other words, the downloading of the (k+1)^th media segment file MSFk+1 is performed in parallel with the playback of the second part of the k^th media segment file MSFk.

At step S550, playback up to the second part of the k^th media segment file MSFk is completed. Thereafter, at step S560, the (k+1)^th media segment file MSFk+1 starts to be played back.

According to the principles and exemplary embodiments of the invention, the part of the (k+1)^th media segment file MSFk+1 is downloaded while the remaining second part of the k^th media segment file MSFk is played back. The downloaded part of the (k+1)^th media segment file MSFk+1 is loaded in the internal memory of the user terminal 140. Given that the loaded data is a part of the media segment files generated as the media data MD is divided, the space of the internal memory necessary to load the downloaded data may be relatively small. In addition, since the part of the (k+1)^th media segment file MSFk+1 is loaded in the internal memory, the (k+1)^th media segment file MSFk+1 may be played back without an initial time delay at a time when the playback of the k^th media segment file MSFk is completed. Thus, even while the internal memory of the relatively small space is used, the media segment files may be continuously played back without significant time delay.

Figure 9:
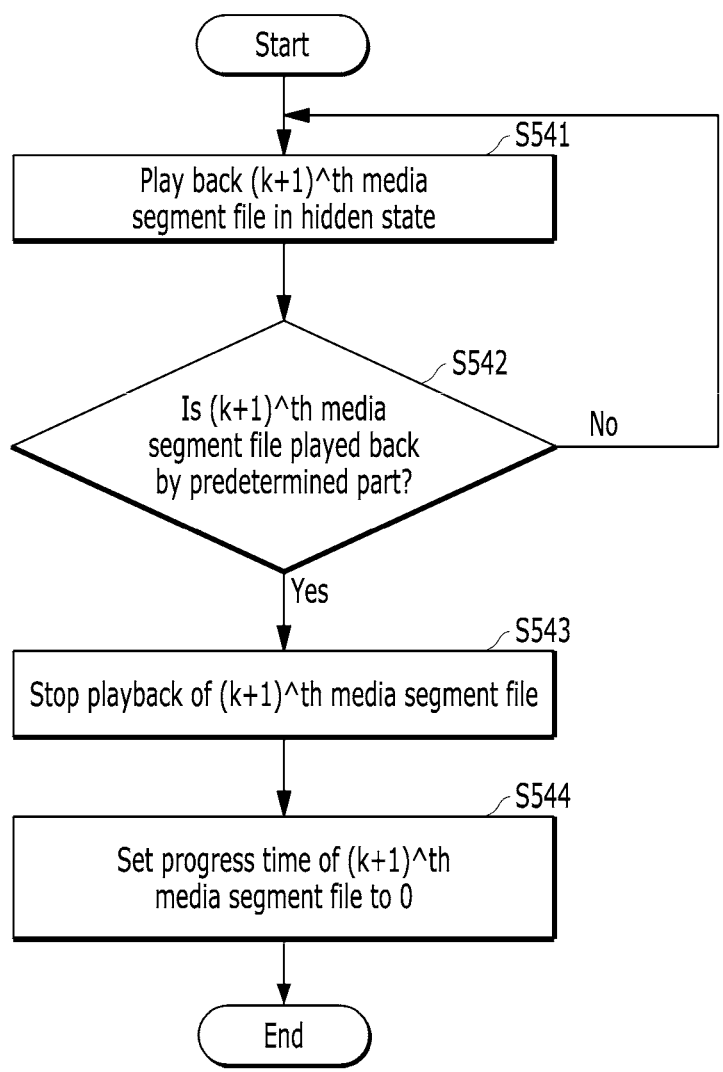
FIG. 9 is a flow chart illustrating an exemplary embodiment of the step S540 of FIG. 8.

FIG. 9 is a flow chart illustrating an exemplary embodiment of the step S540 of FIG. 8. Steps to be described below with reference to FIG. 9 are performed while the remaining second part of the k^th media segment file MSFk is played back in a visible state.

Referring to FIG. 9, at step S541, the (k+1)^th media segment file MSFk+1 is played back in a hidden state, as is known in the art. Additionally, the (k+1)^th media segment file MSFk+1 may be played back in a mute state. By causing the application of the user terminal 140 to execute an instruction for playing back the (k+1)^th media segment file MSFk+1, the (k+1)^th media segment file MSFk+1 may be played back while being downloaded.

At step S542, whether the (k+1)^th media segment file MSFk+1 is played back by a predetermined part is determined. The step S541 and the step S542 are repeated until the (k+1)^th media segment file MSFk+1 is played back by the predetermined part.

At step S543, the playback of the (k+1)^th media segment file MSFk+1 is stopped. By causing the application of the user terminal 140 to execute an instruction for stopping the playback, the downloading of the (k+1)^th media segment file MSFk+1 may be stopped. By performing the step S541 to the step S543, the user terminal 140 may download the part of the (k+1)^th media segment file MSFk+1. For example, the downloaded part of the (k+1)^th media segment file MSFk+1 may be loaded in the internal memory of the user terminal 140.

At step S544, the progress time of the (k+1)^th media segment file MSFk+1 is set to 0. Thereafter, at a time when the playback of the k^th media segment file MSFk is completed, the user terminal 140 plays back the (k+1)^th media segment file MSFk+1 from the set progress time in a visible state. Accordingly, the playback of the (k+1)^th media segment file MSFk+1 may be started without an initial time delay at substantially the same time as the time when the playback of the k^th media segment file MSFk is completed.

FIGS. 10 to 14 are conceptual diagrams illustrating exemplary embodiments of some steps for downloading and playing back a k^th media segment file and a (k+1)^th media segment file. In FIGS. 10 to 14, a downloaded part of a media segment file is shown by a solid line, and a part of the media segment file which is not downloaded yet is shown by a dashed line.

Figure 10:
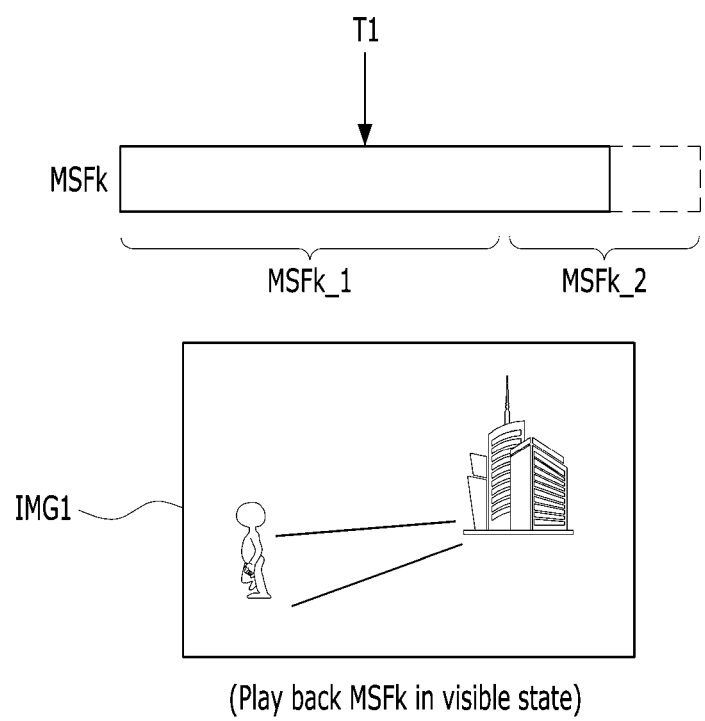

First, referring to FIG. 10, as the k^th media segment file MSFk is downloaded, it is played back in a visible state. The k^th media segment file MSFk is being played back at a first progress time T1. The k^th media segment file MSFk includes a first part MSFk_1 and a second part MSFk_2. The first progress time T1 is positioned in the first part MSFk_1. Download for the (k+1)^th media segment file MSFk+1 is not started yet.

A first image IMG1 shows an image which is displayed on the user terminal 140 when the k^th media segment file MSFk is played back at the first progress time T1.

Figure 11:
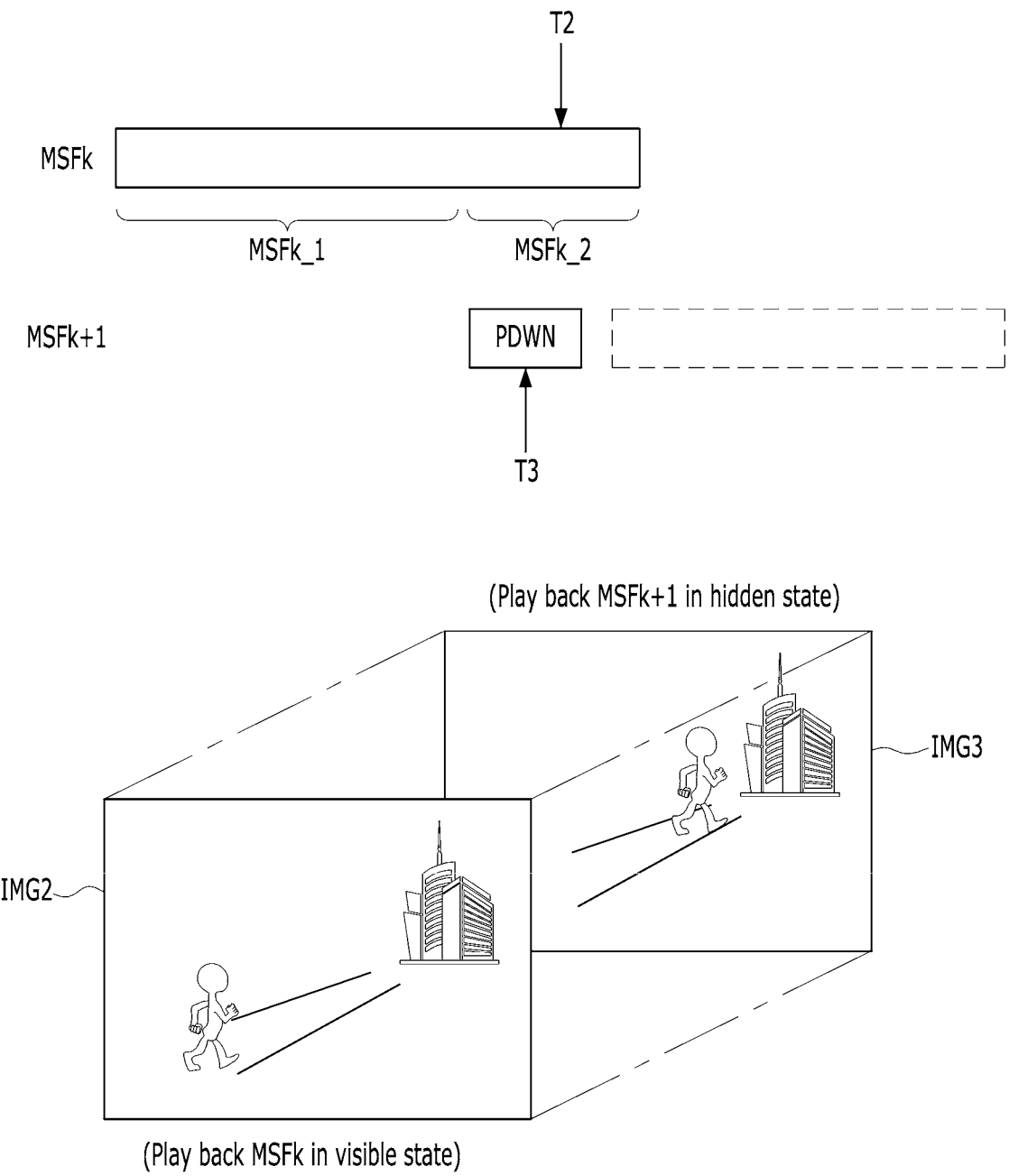

Referring to FIG. 11, as the k^th media segment file MSFk is continuously downloaded, it is played back in the visible state. The k^th media segment file MSFk is being played back at a second progress time T2. The second progress time T2 is positioned in the second part MSFk_2 of the k^th media segment file MSFk. When the second part MSFk_2 of the k^th media segment file MSFk is played back, the (k+1)^th media segment file MSFk+1 may be played back for a predetermined time in a hidden state and a mute state. Therefore, a part PDWN of the (k+1)^th media segment file MSFk+1 may be downloaded and be loaded in the internal memory. In an exemplary embodiment, since download speed is faster than a playback speed, the pre-downloaded part PDWN of the (k+1)^th media segment file MSFk+1 may be longer than a part of the (k+1)^th media segment file MSFk+1 which is played back in the hidden state and the mute state.

A second image IMG2 shows an image which is displayed on the user terminal 140 when the k^th media segment file MSFk is played back at the second progress time T2, and a third image IMG3 shows an image which is displayed in the hidden state when the (k+1)^th media segment file MSFk+1 is played back at a third progress time T3. At this time, as shown in FIG. 11, a position on a display where the (k+1)^th media segment file MSFk+1 is played back may overlap with a position where the k^th media segment file MSFk is played back.

Figure 12:
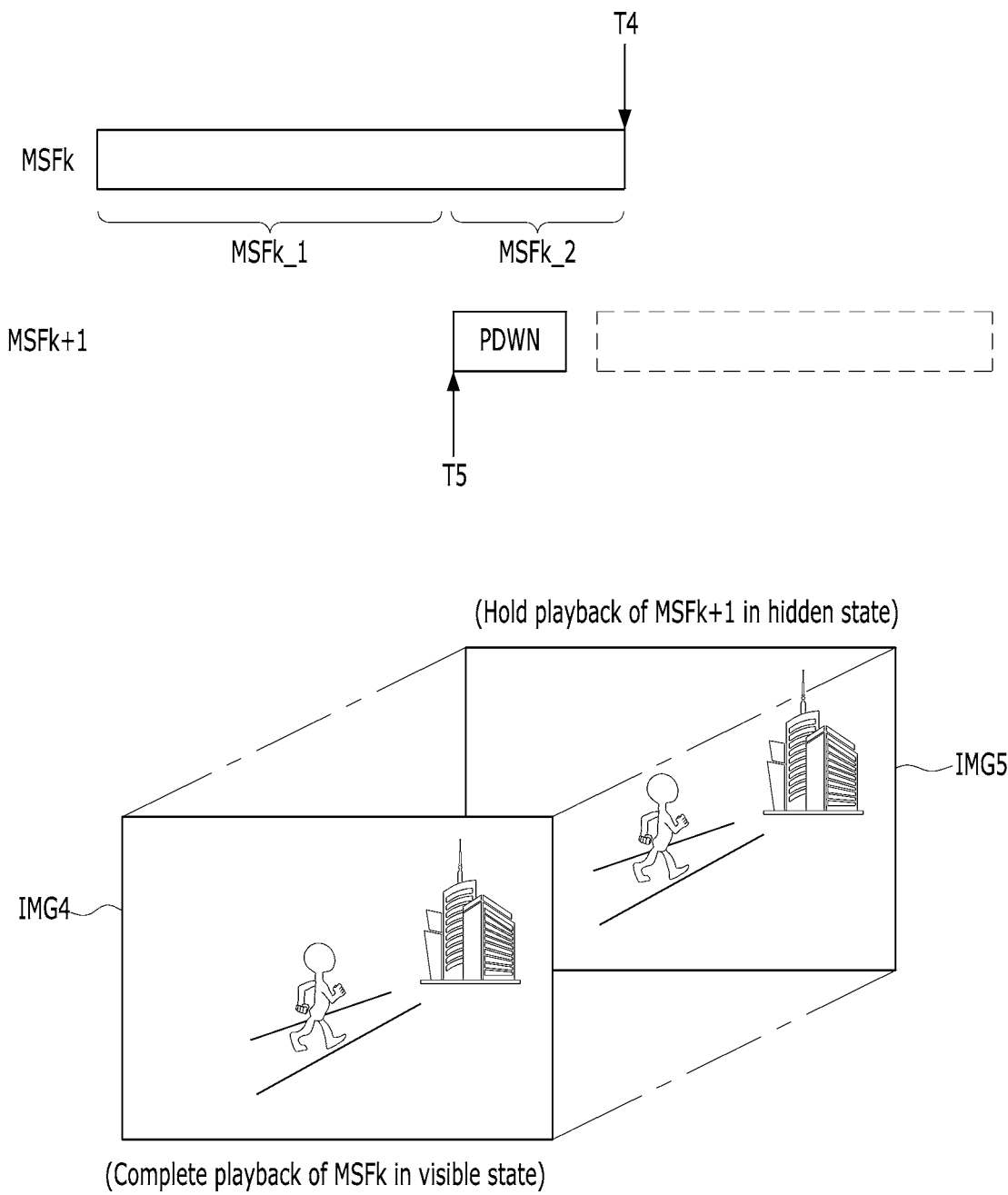

Referring to FIG. 12, as the k^th media segment file MSFk is continuously played back to a fourth progress time T4, playback for the k^th media segment file MSFk is completed. Meanwhile, after the (k+1)^th media segment file MSFk+1 is played back in the hidden state and the mute state for the predetermined time, the progress time of the (k+1)^th media segment file MSFk+1 may be set to 0, that is, a fifth progress time T5. Then, playback for the (k+1)^th media segment file MSFk+1 may be held until playback for the k^th media segment file MSFk is completed.

A fourth image IMG4 shows an image which is displayed on the user terminal 140 when the k^th media segment file MSFk is played back at the fourth progress time T4, and a fifth image IMG5 shows an image which is displayed in the hidden state when the playback of the (k+1)^th media segment file MSFk+1 is held at the fifth progress time T5. Given that the k^th media segment file MSFk and the (k+1)^th media segment file MSFk+1 have continuous time intervals, the fourth image IMG4 and the fifth image IMG5 may be similar to each other or be substantially the same with each other. If the time intervals of the k^th media segment file MSFk and the (k+1)^th media segment file MSFk+1 are not continuous, the fourth image IMG4 and the fifth image IMG5 may be different from each other.

Figure 13:
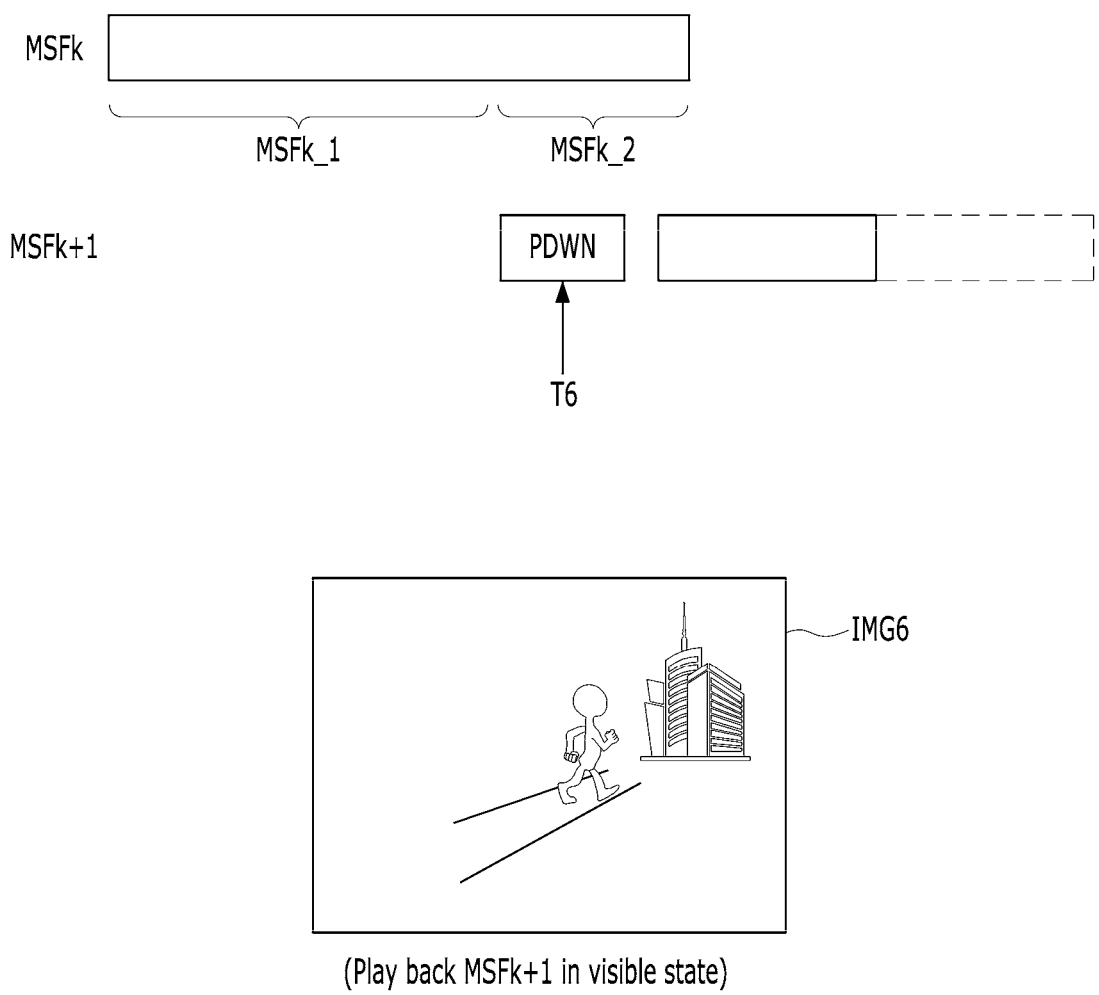

Referring to FIG. 13, as the pre-downloaded part PDWN of the (k+1)^th media segment file MSFk+1 is played back in a visible state, the remaining part of the (k+1)^th media segment file MSFk+1 is continuously downloaded. A sixth progress time T6 is positioned in the pre-downloaded part PDWN of the (k+1)^th media segment file MSFk+1.

A sixth image IMG6 shows an image which is displayed on the user terminal 140 when the (k+1)^th media segment file MSFk+1 is played back at the sixth progress time T6.

Referring to FIG. 14, the (k+1)^th media segment file MSFk+1 is continuously played back in the visible state. A seventh image IMG7 shows an image which is displayed on the user terminal 140 when the (k+1)^th media segment file MSFk+1 is played back at a seventh progress time T7. The (k+1)^th media segment file MSFk+1 may include a first part MSFk+1_1 and a second part MSFk+1_2. While not shown, when the (k+1)^th media segment file MSFk+1 is continuously played back and the progress time thereof is positioned in the second part MSFk+1_2, a (k+2)^th media segment file MSFk+2 may be played back for a predetermined time in a hidden state and a mute state.

Figure 15:
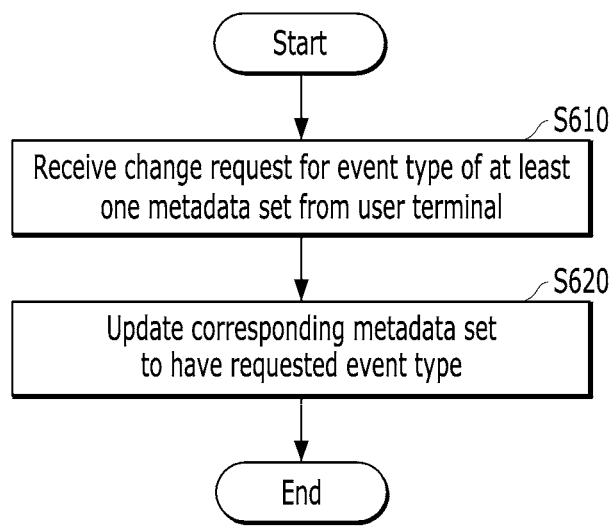
FIG. 15 is a flow chart of an exemplary method of operating a media management server according to the principles of the invention.

FIG. 15 is a flow chart of an exemplary method of operating a media management server according to the principles of the invention.

Referring to FIG. 15, at step S610, a change request for the event type of at least one metadata set is received from the user terminal 140. As described above, the user terminal 140 may download and play back media segment files based on the metadata sets provided from the media management server 130. The user terminal 140 may receive a user input for changing the event type of at least one of the provided metadata sets. For example, when the user terminal 140 plays back media segment files of a selected time interval and a selected event type, a user may recognize that at least one media segment file which is played back does not correspond to the selected event type. In this case, the user may provide an input to change an event type. When the user provides an input to change an event type, the user terminal 140 may request the media management server 130 to change the event type of a corresponding metadata set.

At step S620, the media management server 130 may update the corresponding metadata set to have a requested event type (see MDST' and Event Type of FIG. 6).

Accordingly, the reliability of an event type in a metadata set stored in the media management server 130 may be improved. Thus, when the user terminal 140 or another user terminal requests metadata sets corresponding to not only a selected time interval but also a selected event type as described above with reference to FIG. 5, the media management server 130 may provide metadata sets having improved reliability.

In an exemplary embodiment, an application which is executed by the user terminal 140 may perform the operations described with reference to FIGS. 7 to 9 and 15. The application which is executed by the user terminal 140 may perform instructions which cause the operations. In an exemplary embodiment, the instructions may be received from the external network server 150 (see FIG. 1). For example, when an application such as the web browser of the user terminal 140 accesses the network server 150, the network server 150 may provide the instructions. The application of the user terminal 140 may perform the operations described with reference to FIGS. 7 to 9 and 15, by performing the provided instructions. In another exemplary embodiment, the user terminal 140 may store and execute a dedicated application for performing the operations described with reference to FIGS. 7 to 9 and 15. In this case, the dedicated application may include the instructions. The network server 150 may be a server for providing the dedicated application.

Figure 16:
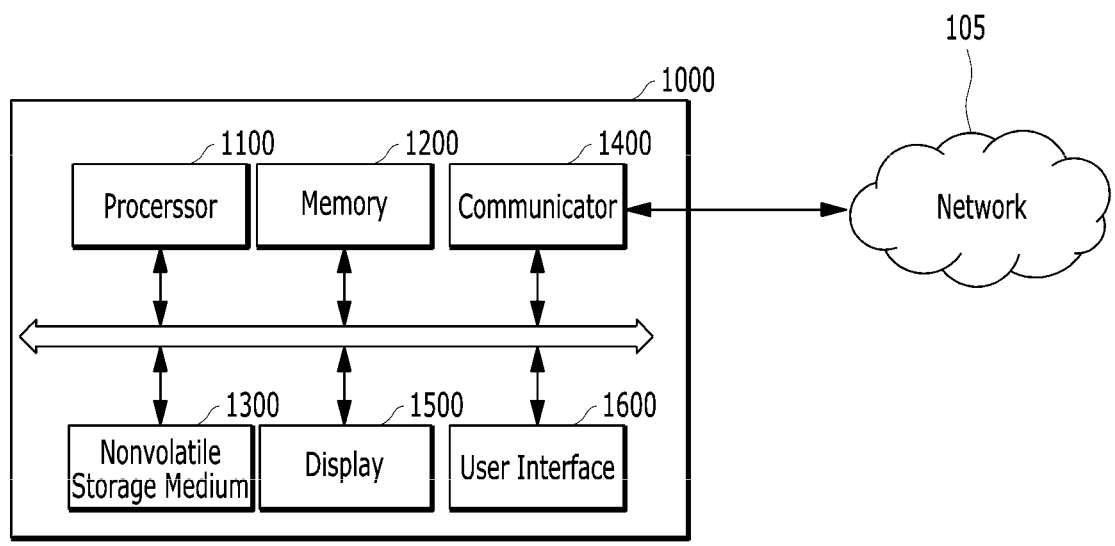
FIG. 16 is a block diagram of an exemplary computer system suitable for implementing a user terminal.

FIG. 16 is a block diagram of an exemplary computer system suitable for implementing a user terminal.

Referring to FIG. 16, the computer system 1000 includes a processor 1100, a memory 1200, a nonvolatile storage medium 1300, a communicator 1400, a display 1500 and a user interface 1600.

The processor 1100 may drive an application which executes instructions causing the operations described above with reference to FIGS. 7 to 9 and 15. The processor 1100 may load program codes corresponding to the application, and may drive the application by executing the loaded program codes.

The memory 1200 may include at least one of various types of memories such as an SRAM (static RAM), a DRAM (dynamic RAM) and an SDRAM (synchronous DRAM). In an exemplary embodiment, the memory 1200 may be used in downloading and playing back the k^th to n^th media segment files MSFk to MSFn of FIG. 7. In an exemplary embodiment, the memory 1200 may be used as a working memory of the processor 1100. In another exemplary embodiment, the processor 1100 may include a working memory which is distinguished from the memory 1200.

The nonvolatile storage medium 1300 may include various types of storage mediums which retain stored data even though power is cut off, for example, storage mediums such as a flash memory and a hard disk.

The communicator 1400 (transceiver) transmits and receives signals between the computer system 1000 and other devices through a network 105.

The display 1500 displays the information processed in the computer system 1000, according to the control of the processor 1100. For example, the display 1500 displays the first to seventh images IMG1 to IMG7 shown in FIGS. 1 to 14.

The user interface 1600 detects a user's input for controlling the operation of the computer system 1000, and generates corresponding input data. The user interface 1600 may include an input device which may detect an instruction or information by the user's manipulation, such as a key pad, a mouse, a finger scan sensor, a dome switch, a touch pad and a jog wheel.

Figure 17:
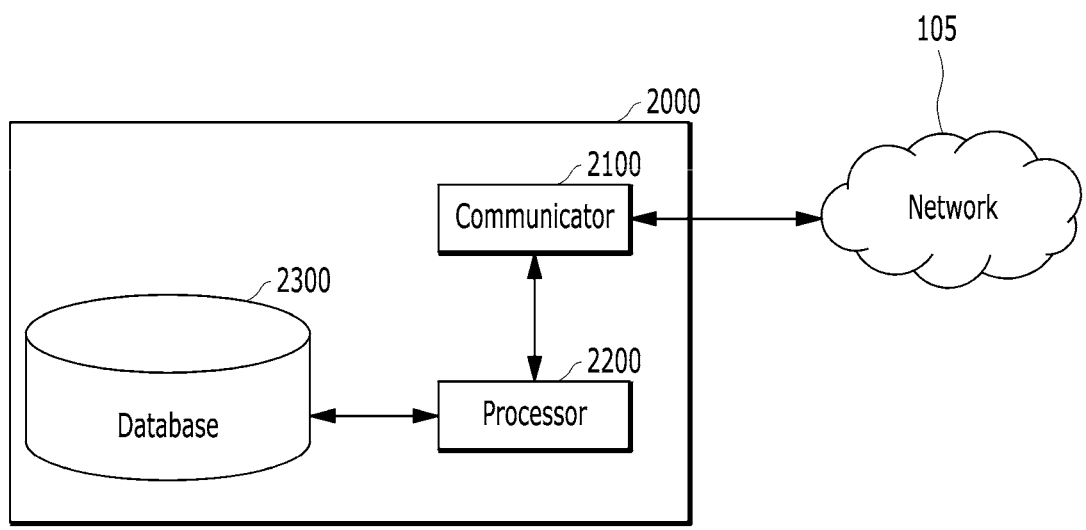
FIG. 17 is a block diagram of an exemplary server system suitable for implementing a media management server and/or a network server.

FIG. 17 is a block diagram of an exemplary server system suitable for implementing a media management server and/or a network server.

The server system 2000 includes a communicator 2100, a processor 2200 and a database 2300. The communicator 2100 transmits and receives signals between the server system 2000 and other devices connected to a network 105. The processor 2200 may transmit the data stored in the database 2300, to the user terminal 140 (see FIG. 1) through the communicator 2100. For example, when the web browser of the user terminal 140 accesses the server system 2000, the server system 2000 may provide instructions to be executed by the web browser, to the user terminal 140 from the database 2300. The web browser of the user terminal 140 may perform the operations described above with reference to FIGS. 7 to 9 and 15, by executing the provided instructions. For example, the server system 2000 may provide a dedicated application to the user terminal 140 from the database 2300. The dedicated application of the user terminal 140 may perform the operations described above with reference to FIGS. 7 to 9 and 15.

While it is illustrated in FIG. 17 that the server system 2000 includes the database 2300, it is to be noted that exemplary embodiments of the invention are not limited thereto. For example, the server system 2000 may access a database which is positioned outside, through the network 105 by using the communicator 2100.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of providing selectable media captured at one location to another location, the method comprising the steps of:
uploading, by a media uploader to a storage device, a plurality of media segment files captured at a first location;
generating, by the media uploader, a plurality of first metadata sets respectively associated with at least one characteristic of the plurality of media segment files;
uploading, by the media uploader, the plurality of first metadata sets to the management server;
uploading, by the media uploader, at least one of the media segment files to the storage device and the same at least one of the media segment files not being stored in the management server, in order to increase efficiency of the management server;
receiving, by the management server, from a user terminal, a message requesting a media segment file based upon the at least one characteristic;
transmitting, by a management server, to the user terminal, a second metadata set corresponding to the at least one characteristic in response to the request message; and
transmitting, by the storage device, in response to a request for at least one media segment file associated with the at least one second metadata set, the requested at least one media segment file to the user terminal.

2. The method according to claim 1, wherein the media segment files captured at the first location are obtained in continuous time intervals, each of the first metadata sets includes information indicating a time interval of a corresponding media segment file, and the at least one characteristic comprises a selected time interval.

3. The method according to claim 1, wherein the at least one characteristic comprises a selected event type, and each of the first metadata sets includes an event type of a corresponding media segment file, and wherein each of the second metadata sets has the selected event type.

4. The method according to claim 1, wherein the step of transmitting the requested at least one media segment file comprises:
transmitting, to the user terminal, the requested at least one media segment file based on HTTP (hypertext transfer protocol) and FTP (file transfer protocol).

5. The method according to claim 1, wherein the step of receiving of the plurality of media segment files comprises:
uploading the plurality of media segment files, by the media uploader, based on HTTP and the FTP.

6. The method according to claim 1, wherein the at least one characteristic further comprises a selected event type.

7. The method according to claim 6, further comprising the steps of:
receiving a request to change an event type of at least one of the plurality of first metadata sets; and
updating the at least one first metadata set, to have the changed event type.

8. The system according to claim 1, wherein each of the plurality of first metadata sets further includes an event type of a corresponding media segment file, and wherein the at least one second metadata set has the selected event type.

9. The system according to claim 1, wherein the plurality of segment files stored in the storage device are parsed in a predetermined time unit.

10. The system according to claim 9, wherein the management server is further configured to search the at least one second meta data set related to a specific time interval among the plurality of meta data sets.

11. The system for playing a media through a real-time streaming, the system comprising:
- a processor;
- a memory;
- a media uploader configured to: parse a media data into first to m-th media segment files corresponding to successive time intervals, respectively,
  generate first to m-th meta data sets corresponding to the first to m-th media segment files, respectively,
  transmit the first to the m-th media segment files to a storage device, and
  transmit the first to the m-th metadata sets to a media management server;
  the media uploader uploading at least one of the first to the m-th media segment files to the storage device and the same at least one of the first to the m-th media segment files not being stored in the management server, in order to increase efficiency of the management server; wherein the media uploader is executed on the processor;
- a media management server configured to: receive a request for at least one metadata set related to a specific time interval among the first to m-th metadata sets from a userterminal, and
  transmit the at least one metadata set related tothe specific time interval to the userterminal;
- a storage device configured to: receive a request for at least one media segment file corresponding to the at least one metadata set from the userterminal, and
  transmit the at least one media segment file to the user terminal in response to the request; and
- a userterminal configured to: sequentially receive the at least one media segment file from the storage device based on the at least one metadata set received from the media management server, and play the received at least one media segment file,
  wherein the first to m-th metadata sets are transmitted tothe media management server after the first to m-th media segment files are transmitted tothe storage device, and
  wherein each of the first to m-th metadata sets includes information related to an address in which a corresponding media segment file is stored.

12. The system according to claim 11, wherein the management server is further configured to:
- receive a request to change an event type of at least one of the metadata sets; and
- update the at least one of the metadata sets to have the changed event type.

13. The system according to 11, wherein each of the first to m-th metadata sets further includes an event type of each of the corresponding first to m-th media segment file.

14. The system according to claim 11, wherein the first to m-th media segment files stored in the storage device are parsed in a predetermined time unit.

15. The system for playing a media through a real-time streaming, the system comprising: a processor; a memory;
- a media uploader configured to: parse a media data into first to m-th media segment files corresponding to successive time intervals, respectively,
  generate first to m-th metadata sets corresponding to the first to m-th media segment files, respectively,
  transmit the first to the m-th media segment files to a storage device, and
  transmit the first to the m-th metadata sets to a media management server; wherein the media uploader is executed on the processor;
- a media management server configured to: receive a request for at least one metadata set related to a specific time interval among the first to m-th metadata sets from a userterminal, and
  transmit the at least one metadata set related tothe specific time interval to the userterminal;
- a storage device configured to: receive a request for at least one media segment file corresponding to the at least one metadata set from the userterminal, and
  transmit the at least one media segment file to the user terminal in response to the request; and
- a userterminal configured to: sequentially receive the at least one media segment file from the storage device based on the at least one metadata set received from the media management server, and
  play the received at least one media segment file, wherein the first to m-th metadata sets are transmitted to the media management server after the first to m-th media segment files are transmitted to the storage device, and
  wherein each of the first to m-th metadata sets includes information related to an address in which a corresponding media segment file is stored.

16. The system according to claim 15, wherein the management server is further configured to:
- receive a request to change an event type of at least one of the metadata sets; and
- update the at least one of the metadata sets to have the changed event type.

17. The system according to 15, wherein each of the first to m-th metadata sets further includes an event type of each of the corresponding first to m-th media segment file.

18. The system according to claim 15, wherein the first to m-th media segment files stored in the storage device are parsed in a predetermined time unit.

* * * * *